(12) United States Patent
Wiegman

(10) Patent No.: US 12,071,223 B2
(45) Date of Patent: *Aug. 27, 2024

(54) SYSTEM AND METHOD FOR AUTOMATED FLIGHT CORRECTION IN AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,043

(22) Filed: Jan. 6, 2023

(65) Prior Publication Data

US 2023/0150653 A1 May 18, 2023

Related U.S. Application Data

(63) Continuation of application No. 17/474,695, filed on Sep. 14, 2021, now Pat. No. 11,577,822.

(51) Int. Cl.
| | |
|---|---|
| *B64C 13/50* | (2006.01) |
| *B64C 13/18* | (2006.01) |
| *B64C 13/20* | (2006.01) |
| *B64C 13/22* | (2006.01) |
| *B64C 29/00* | (2006.01) |
| *B64C 39/02* | (2023.01) |
| *G05D 1/00* | (2024.01) |

(52) U.S. Cl.
CPC ............ *B64C 13/506* (2018.01); *B64C 13/18* (2013.01); *B64C 13/20* (2013.01); *B64C 29/0025* (2013.01); *B64C 39/024* (2013.01); *G05D 1/0061* (2013.01); *G05D 1/102* (2013.01); *B64C 13/22* (2013.01)

(58) Field of Classification Search
CPC ....... B64C 13/506; B64C 13/18; B64C 13/20; B64C 13/22; B64C 29/0025; B64C 39/024; B64U 10/20; G05D 1/102; G05D 1/0061

See application file for complete search history.

(56) References Cited

U.S. PATENT DOCUMENTS

| | | | |
|---|---|---|---|
| 8,401,716 B2* | 3/2013 | Ciholas | B64C 9/10 |
| | | | 244/76 R |
| 10,370,099 B2 | 8/2019 | Mahboubi | |
| 10,661,902 B1* | 5/2020 | Tavshikar | G07C 5/008 |
| 10,997,865 B2* | 5/2021 | Boozarjomehri | G08G 5/0034 |
| 11,161,611 B2* | 11/2021 | Zhang | G08G 5/0013 |

(Continued)

*Primary Examiner* — Rodney A Bonnette
(74) *Attorney, Agent, or Firm* — Lee & Hayes, P.C.

(57) ABSTRACT

A system for automated flight correction in an electric aircraft includes an input control configured to generate a control datum, at least a sensor connected to the electric aircraft, wherein the at least a sensor is configured to detect a status datum, and a flight controller communicatively connected to the input control and the at least a sensor, wherein the flight controller is configured to determine a command datum as a function of the control datum and the status datum, wherein determining the command datum comprises comparing the control datum to a limitation set based on the status datum, and calculating a modified control datum based on a flight plan of the electric aircraft through a remote device.

20 Claims, 6 Drawing Sheets

(56) References Cited

U.S. PATENT DOCUMENTS

| | | | |
|---|---|---|---|
| 11,208,200 B1* | 12/2021 | Auerbach | B64C 13/0421 |
| 2007/0055434 A1* | 3/2007 | Kohlmann | B64D 45/0034 |
| | | | 701/100 |
| 2014/0209751 A1 | 7/2014 | Stagmer | |
| 2017/0060128 A1* | 3/2017 | Matloff | B64C 39/024 |
| 2017/0121034 A1 | 5/2017 | Fisher | |
| 2017/0153650 A1 | 6/2017 | Chang | |
| 2017/0275011 A1* | 9/2017 | Luszcz | B64C 27/10 |
| 2021/0109547 A1* | 4/2021 | Clark | G05D 1/0816 |

* cited by examiner

SYSTEM AND METHOD FOR AUTOMATED FLIGHT CORRECTION IN AN ELECTRIC AIRCRAFT

CROSS REFERENCE TO RELATED APPLICATIONS

This application is a continuation of U.S. Non-Provisional application Ser. No. 17/474,695, filed on Sep. 14, 2021, and entitled "SYSTEM AND METHOD FOR AUTOMATED FLIGHT CORRECTION IN AN ELECTRIC AIRCRAFT," the entirety of which is incorporated herein by reference.

FIELD OF THE INVENTION

The present invention generally relates to the field of electric aircraft. In particular, the present invention is directed to system and method for automated flight correction in an electric aircraft.

BACKGROUND

In a situation where sensors in an aircraft detects that a component of the aircraft is not performing as they should, such as overheating batteries, or those sensors detect that certain maneuvers may create unstable flight conditions due to the weather outside the aircraft, it is imperative that the aircraft only performs within safe conditions. It is desirable to have a system that prevents a pilot from pushing the aircraft beyond its safe operation as to prevent damage to the aircraft and ensure the safety of the pilot and passengers inside the aircraft.

SUMMARY OF THE DISCLOSURE

In an aspect a system for automated flight correction in an electric aircraft includes an input control configured to generate a control datum, at least a sensor connected to the electric aircraft, wherein the at least a sensor is configured to detect a status datum, and a flight controller communicatively connected to the input control and the at least a sensor, wherein the flight controller is configured to determine a command datum as a function of the control datum and the status datum, wherein determining the command datum includes comparing the control datum to a limitation set based on the status datum, and calculating a modified control datum based on a flight plan of the electric aircraft through a remote device.

In another aspect a method for automated flight correction in an electric aircraft includes generating, at an input control, a control datum, detecting, at least a sensor, a status datum, determining, at a flight controller, a command datum as a function of the control datum and the status datum, wherein determining includes comparing the control datum to a limitation set based on the status datum, and calculating a modified control datum based on a flight plan of the electric aircraft through a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated flight correction in an electric aircraft. In an embodiment, the system includes an input control configured to generate a control datum, at least a sensor connected to the electric aircraft, wherein the at least a sensor is configured to detect a status datum, and a flight controller communicatively connected to the input control and the at least a sensor, wherein the flight controller is configured to determine a command datum as a function of the control datum and the status datum, wherein determining the command datum comprises comparing the control datum to a limitation set based on the status datum, and calculating a modified control datum based on a flight plan of the electric aircraft through a remote device.

Aspects of the present disclosure can be used to prevent a user from performing maneuvers, or giving commands, that may be unsafe or damage the aircraft. Aspects of the present disclosure can also be used to prevent the electric aircraft from performing actions that pushes the electric aircraft over a limit, such as an altitude limitation set by a fleet operator. This is so, at least in part, because system is configured to take the status of the aircraft through at least a sensor, and also other data such as flight plans or machine learning data, and determine if actuator should perform action requested by a user, if not flight controller transmit a different set of commands to the actuator.

Exemplary embodiments illustrating aspects of the present disclosure are described below in the context of several specific examples.

Figure 1:
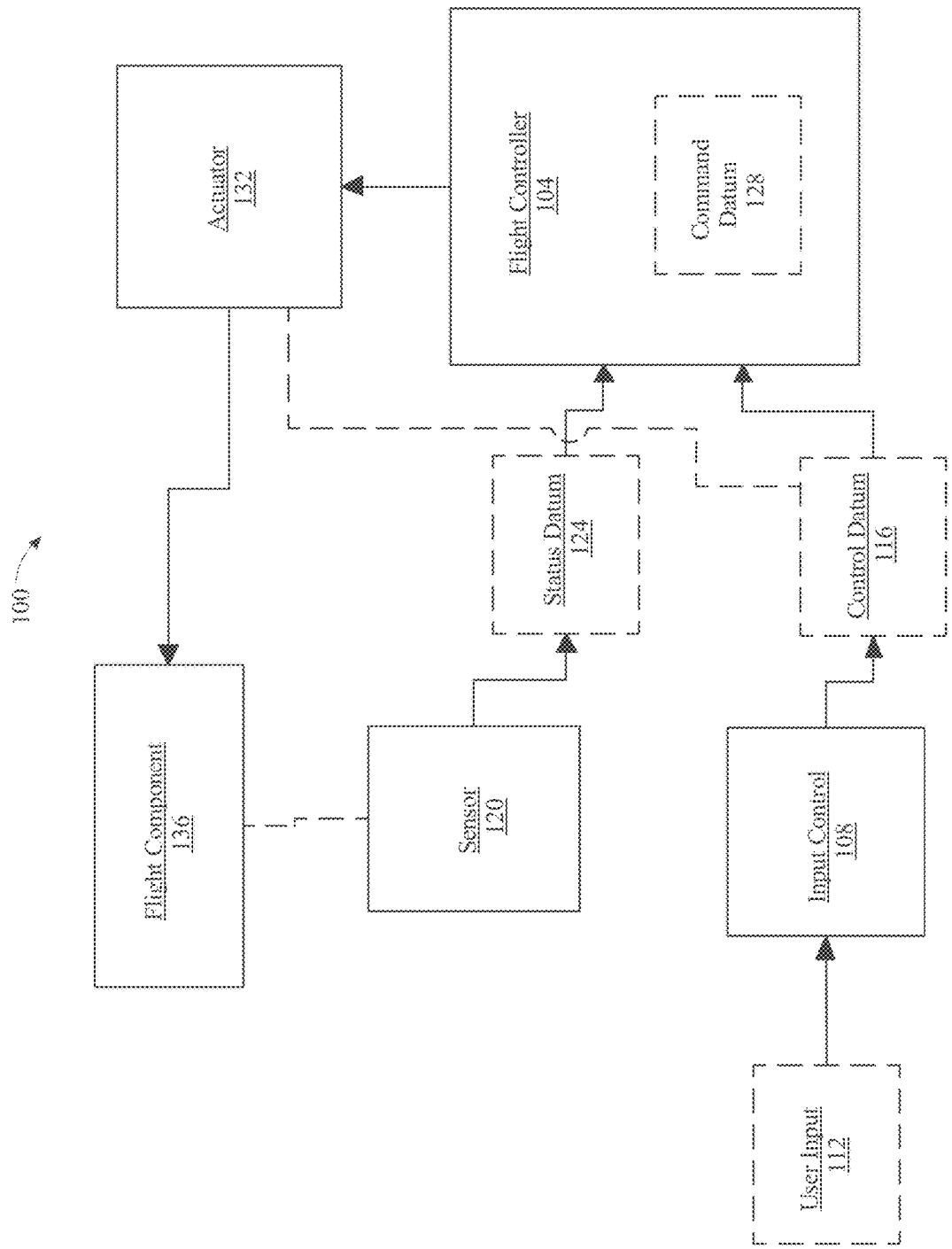
FIG. 1 is a block diagram of a system for automated flight correction in an electric aircraft.

Referring now to FIG. 1, an exemplary embodiment of a system 100 for automated flight correction in an electric aircraft is illustrated. System includes a flight controller 104. Flight controller 104 may include any computing device as described in this disclosure, including without limitation a microcontroller, microprocessor, digital signal processor (DSP) and/or system on a chip (SoC) as described in this disclosure. Flight controller 104 may include, be included in, and/or communicate with a mobile device such as a mobile telephone or smartphone. Flight controller 104 may include a single computing device operating independently, or may include two or more computing device operating in concert, in parallel, sequentially or the like; two or more computing devices may be included together in a single computing device or in two or more computing devices. Flight controller 104 may interface or communicate with one or more additional devices as described below in further detail via a network interface device. Network interface device may be utilized for connecting flight controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 104 may include but is not limited to, for example, a computing device or cluster of computing devices in a first location and a second computing device or cluster of computing devices in a second location. Flight controller 104 may include one or more computing devices dedicated to data storage, security, distribution of traffic for load balancing, and the like. Flight controller 104 may distribute one or more computing tasks as described below across a plurality of computing devices of computing device, which may operate in parallel, in series, redundantly, or in any other manner used for distribution of tasks or memory between computing devices. Flight controller 104 may be implemented using a "shared nothing" architecture in which data is cached at the worker, in an embodiment, this may enable scalability of system 100 and/or computing device.

With continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 includes an input control 108. As used in this disclosure, "input control" is any device used by a pilot and. or remote pilot to control the aircraft, such as controlling yaw, pitch, roll, attitude, and the like. Input control 108 is configured to receive a user input 112 and generate a control datum 116 as a function of the user input 112. Input control 108 may include a throttle lever, inceptor stick, collective pitch control, steering wheel, brake pedals, pedal controls, toggles, joystick. One of ordinary skill in the art, upon reading the entirety of this disclosure would appreciate the variety of input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, input control 108 may include one or more data sources providing raw data. "Raw data", for the purposes of this disclosure, is data representative of aircraft information that has not been conditioned, manipulated, or processed in a manner that renders data unrepresentative of aircraft information. Input control 108 may be exterior sensor data, interior sensor data, data retrieved from one or more remotely or onboard computing devices. Input control 108 may include audiovisual data, pilot voice data, biometric data, or a combination thereof. Input control 108 may include information or raw data gathered from gyroscopes, inertial measurement units (IMUs), motion sensors, a combination thereof, or another sensor or grouping of sensors. The IMU may, in non-limiting embodiments, may broadcast attitude information relating to the aircraft for use by one or more other components in the system 100. For example, and without limitation, the broadcast attitude information by IMU may be used as input control 108 for use by one or more inverters and combined with input controls 108 for a reduced control. Input control 108 may be physically located in the cockpit of the aircraft or remotely located outside of the aircraft in another location communicatively connected to at least a portion of the aircraft. "Communicatively connected", for the purposes of this disclosure, is a process whereby one device, component, or circuit is able to receive data from and/or transmit data to another device, component, or circuit; communicative coupling may be performed by wired or wireless electronic communication, either directly or by way of one or more intervening devices or components. In an embodiment, communicative coupling includes electrically coupling an output of one device, component, or circuit to an input of another device, component, or circuit. Communicative coupling may be performed via a bus or other facility for intercommunication between elements of a computing device. Communicative coupling may include indirect connections via "wireless" connection, low power wide area network, radio communication, optical communication, magnetic, capacitive, or optical coupling, or the like.

Continuing to refer to FIG. 1, in an embodiment, system 100 and/or input control 108 is configured to receive user input 112. As used in this disclosure a "user input" is any element of datum representing one or more functions a pilot is controlling and/or adjusting. For example, the user input may denote that a pilot is controlling and/or maneuvering ailerons, wherein the pilot is not in control of the rudders and/or propulsors. In an embodiment, the user input may include an implicit signal and/or an explicit signal. For example, and without limitation, the user input may include an explicit signal, wherein the pilot explicitly states there is a lack of control and/or desire for autonomous function. As a further non-limiting example, the user input may include an explicit signal directing computing device 104 to control and/or maintain a portion of aircraft, a portion of the flight plan, the entire aircraft, the at least a flight component 108, and/or the entire flight plan. As a further non-limiting example, the user input may include an implicit signal, wherein computing device 104 detects a lack of control such as by a malfunction, torque alteration, flight path deviation, and the like thereof. In an embodiment, and without limitation, the user input may include one or more explicit signals to reduce torque, and/or one or more implicit signals that torque may be reduced due to reduction of airspeed velocity. In an embodiment, and without limitation, the user input may include one or more local and/or global signals. For example, and without limitation, the user input may include a local signal that is transmitted by a pilot and/or crew member. As a further non-limiting example, the user input may include a global signal that is transmitted by air traffic control and/or one or more remote users that are in communication with the pilot of aircraft. In an embodiment, the user input may be received as a function of a tri-state bus and/or multiplexor that denotes an explicit user input should be transmitted prior to any implicit or global user input.

Continuing to refer to FIG. 1. "Control datum", for the purposes of this disclosure, refers to any element of data identifying and/or a user input or command. Input control 108 may be communicatively connected to any other component presented in system, the communicative connection may include redundant connections configured to safeguard against single-point failure. Control datum 116 may indicate a pilot's desire to change the heading or trim of an electric aircraft. Control datum 116 may indicate a pilot's desire to change an aircraft's pitch, roll, yaw, or throttle. In an embodiment, "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. User input 112, when referring to throttle, may refer to a pilot's desire to increase or decrease thrust produced by at least a propulsor. Control datum 116 may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Control datum 116 may include circuitry, computing devices, electronic components, or a combination thereof that translates user input 112 into at least an electronic signal configured to be transmitted to another electronic component.

Continuing to refer to FIG. 1, system 100 includes at least a sensor 120 connected to the electric aircraft. At least a sensor 120 is configured to detect a status datum 124 and transmit status datum 124 to flight controller 104. "Status datum" as used in this disclosure includes any data detected by at least a sensor 120. At least a sensor 120 connected to the electric aircraft may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor 120 connected to the electric aircraft may include, torque sensor, gyroscope, accelerometer, torque sensor, magnetometer, inertial measurement unit (IMU), pressure sensor, force sensor, proximity sensor, displacement sensor, vibration sensor, among others. At least a sensor 120 connected to the electric aircraft may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. In another nonlimiting example, a flight controller alters aircraft usage pursuant to sensor readings.

Continuing to refer to FIG. 1, at least a sensor 120 may further include, without limitation, a device that performs radio detection and ranging (RADAR), a device that performs lidar, a device that performs sound navigation ranging (SONAR), an optical device such as a camera, electro-optical (EO) sensors that produce images that mimic human sight, or any other sensor 104 that may occur to a person having ordinary skill in the art upon. At least a sensor 120 may include a sense-and-avoidance system (SAA) that detects and avoids collisions. SAA may include traffic collision avoidance system (TCAS) and ground-based sense-and-avoid (GBSAA) using primary radar. SAA may operate one or more protocols requiring the aircraft to remain well clear from and avoid collisions with other airborne traffic. SAA may also perform one or more protocols to compensate for the lack of an on-board pilot, and to define an operational concept that will enable the SAA-equipped aircraft to smoothly integrate into an air traffic services environment.

Alternatively, or additionally, and still referring to FIG. 1. At least a sensor 120 may include an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, at least a sensor 120 may include a geospatial sensor. As used herein, a geospatial sensor may include optical/radar/Lidar, GPS and may be used to detect aircraft location, aircraft speed, aircraft altitude and whether the aircraft is on the correct location of the flight plan. An environmental sensor may further collect environmental information from the predetermined area, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Local sensor may detect an environmental parameter, a temperature, a barometric pressure, a location parameter, and/or other necessary measurements.

With continued reference to FIG. 1, flight controller 104 is communicatively connected to input control 108 and at least a sensor 120. Flight controller 104 is configured to receive control datum 116 from the input control 108, receive status datum 124 from the flight controller 104, and determine a command datum 128 as a function of control datum 116 and status datum 124. In an embodiment, flight controller 104 may be configured to transmit the command datum to a remote device. In a nonlimiting example, flight controller 104 may determine a command datum that differs from the control datum 116 based on the status datum 124, such as when a sensor may detect that increasing the throttle may damage the battery by overheating it. In another nonlimiting example, after flight controller 104 determines a command datum 128 that differs from control datum 116, flight controller 104 may send the differing command to a remote device, such as a laptop used by a fleet operator. "Command datum" 128 as used in this disclosure is any data describing an adjustment to at least a flight component in an electric aircraft. Command datum 128 may indicate a command to change the heading or trim of an electric aircraft. Command datum 128 may further include a command to adjust the torque produced by a propulsor in an electric aircraft. Command datum 128 may indicate a command to change an aircraft's pitch, roll, yaw, or throttle. Command datum 128 may include a desired torque, wherein a flight component may be configured to operate at the desired torque. Command datum 128 may also include at least an element of data identifying at least a command, at least a maneuver, at least an element of data from machine learning process, at least an element of a flight plan, and the like.

Still referring to FIG. 1. In embodiments, flight controller 104 may be communicatively connected to a data store system. "Data store system", for the purpose of this disclosure, refers to any system configured to store data, such as a database. Data store system may be implemented, without limitation, as a relational database, a key-value retrieval datastore such as a NOSQL database, or any other format or structure for use as a datastore that a person skilled in the art would recognize as suitable upon review of the entirety of this disclosure. In a nonlimiting example, flight controller 104 may be connected to a database. In an embodiment, data store system may store operational data of the electric aircraft, which flight controller 104 use to compare to status datum 124. In an embodiment, data store system may include multiple data stores. In a nonlimiting example, flight controller may include a local copy of a database that is synched with a remote database periodically. In an embodiment, flight controller 104 may be configured to override the command datum 128 as a function of a user input. In a nonlimiting example, a pilot may have an option, such as through a GUI, to override the command datum 128, such as an option to use the control datum 116 instead of the command datum 128, which it may be useful in a circumstance where the flight controller 104 malfunctions. In embodiments, flight controller 104 may be configured to determine command datum 128 as a function of a remote device. In a nonlimiting example, a fleet operator may set further limitations, such as a maximum altitude, where the flight controller 104 uses those limitations in determining the command datum 128.

Alternatively, or additionally, and continuing to refer to FIG. 1. In an embodiment, flight controller 104 may be further configured to determine command datum 128 as a function of machine learning process. Machine learning process may be trained using training data that includes correlation of commands and sensor data from the electric aircraft or aircrafts, such as aircrafts that are part of the same fleet. Machine learning process may use past command datums 128 from the same aircraft, or other aircrafts, as training data. Machine learning process may use training data stored at a local data store system, such as a database stored in the aircraft. Machine learning process may use training data that is stored at a remote data store system, such as remote database accessed through a mobile data network. Machine learning model is described in detail further below.

Additionally, or alternatively, and with continued reference to FIG. 1. In an embodiment, flight controller 104 may be further configured to determine command datum 128 as a function of a flight plan. Flight plan may be generated by flight controller, set by a user, or set by a remote device. Flight plan may be stored in a local, or remote, data store system. Flight plan may be received from a plurality of sources such as Air Traffic Control, Fleet operator, third parties, such as a contractor, and the like. "Flight plan" for the purpose of this disclosure, refers to the optimum set of maneuvers, flight direction, or commands, to be performed by the electric aircraft in order to reach a set objective. Flight plan may include flight limitations such as restricted zones and maximum flight altitude. Flight plan may be consistent with disclosure of flight plan in U.S. patent application Ser. No. 17/365,512 and titled "PILOT-CONTROLLED POSITION GUIDANCE FOR VTOL AIRCRAFT", which is incorporated herein by reference in its entirety. In a nonlimiting example, flight controller 104 may prevent a user from continuing to turn the aircraft towards a direction that differs from the direction set at the flight plan. In another nonlimiting example, flight plan may have topographical data of the area being flown by the aircraft where if the user continues to flight towards a direction the aircraft may hit an obstacle, such as a mountain, where the flight controller may determine a command datum 128 to change direction as to avoid hitting the obstacle.

Still referring to FIG. 1, system 100 includes an actuator 132 connected to flight controller 104. Actuator 132 is configured to receive command datum 128 from flight controller 104 and command at least a flight component 136. "Actuator" as used in this disclosure, is any device that uses a form of power to convert a control signal into mechanical motion. In an embodiment, commanding at least a flight component 136 may include changing a movement datum.

At least a flight component as used in this disclosure is any component of an electric aircraft. For example and without limitation the at least a flight component may include a battery, an alerion, a rotor, a propeller, a winglet, any control mechanism, any component that generates torque, an electric motor, and the like. "Movement datum" as used in this disclosure is a change in an aircraft's pitch, roll, yaw, throttle, torque, heading, trim, or any change that causes the aircraft to perform a movement. Actuator 132 may be configured to move control surfaces of the aircraft in one or both of its two main modes of locomotion or adjust thrust produced at any of the propulsors. These electronic signals can be translated to aircraft control surfaces. These control surfaces, in conjunction with forces induced by environment and propulsion systems, are configured to move the aircraft through a fluid medium, an example of which is air. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used, and described in this disclosure.

Still referring to FIG. 1. In an embodiment, at least a flight component may include a propulsor and the propulsor may include a propeller, a blade, or any combination of the two. A "propulsor", as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates. In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Additionally, or alternatively, and still referring to FIG. 1. In an embodiment, at least a sensor 120 may be communicatively connected to at least a flight component 136. In embodiments, at least a sensor 120 may be further configured to detect status datum 124 as a function of at least a flight component 136. In a nonlimiting example, at least a sensor 120 may detect that one of the propellers is not functioning properly and relay the status of the propeller to the flight controller 104. In another nonlimiting example, at least a sensor 120 may detect an issue with the battery based on the reading of the battery's internal state. In a nonlimiting example, at least a sensor 120 may detect a rapid decrease of useable energy of the battery and relay that data to the flight controller 104, flight controller 104 based on that data may prevent a pilot from continuing to increase altitude if doing so may deplete the battery midflight.

Still referring to FIG. 1. In an embodiment, actuator 132 may be communicatively connected to the input control. In an embodiment, actuator 132 may be configured to receive control datum 116 from input control 108. In an embodiment, input control 108 translates user input 112 into control datum 116, where input control 108 is configured to translate user input 112, in the form of moving an inceptor stick, for example, into electrical signals to at least actuator 132 that in turn, moves at least a portion of the aircraft in a way that manipulates a fluid medium, like air, to accomplish the pilot's desired maneuver. In other embodiments, input control 108 translates user input 112 into control datum 116 and transmits to flight controller 104, where flight controller 104 may then transmit command datum 128 that is the same as control datum 116, if control datum 116 is determined to be within limitation set based on status datum, flight plan, remote device, and/or data from machine learning process, or command datum 128 that is a modified control datum 116 that is compatible with the set limitations. At least a portion of the aircraft that actuator 132 moves may be a control surface. "Remote device" refers to any computing device included in this disclosure that is capable of displaying information to a user. In an embodiment, remote device may be a computing device communicatively connected to flight controller 104. "Displaying" may include information in graphical form, tactile feedback form, audio form, or any other method of delivering information to a user. In an embodiment, remote device may display command datum 128 to the user. In embodiments, remote device may include multiple devices, where each device is configured to display command datum 128. In an embodiment, remote device may be a graphical user interface (GUI) incorporated in the electric aircraft. As described herein, a graphical user interface is a form of user interface that allows users to interact with flight controller 104 through graphical icons and/or visual indicators. The user may, without limitation, interact with graphical user interface through direct manipulation of the graphical elements. Graphical user interface may be configured to display at least an element of a flight plan. As an example, and without limitation, graphical user interface may be displayed on any electronic device, as described herein, such as, without limitation, a computer, tablet, remote device, and/or any other visual display device. Display is configured to present, to a user, information related to command datum 128. Display may include a graphical user interface, multi-function display (MFD), primary display, gauges, graphs, audio cues, visual cues, information on a heads-up display (HUD) or a combination thereof. Display may include a display disposed in one or more areas of an aircraft, on a user device remotely located, one or more computing devices, or a combination thereof. Display may be disposed in a projection, hologram, or screen within a user's helmet, eyeglasses, contact lens, or a combination thereof.

Additionally, or alternatively, and with continued reference to FIG. 1, actuator 132 may be configured to utilize a fall-back flight control system in the event that communication with flight controller 104 is lost. Fall back flight control system is consistent with the disclosure of a fall-back flight control system in U.S. patent application Ser. No. 17/179,826 and titled "METHODS AND SYSTEMS FOR FALL BACK FLIGHT CONTROL CONFIGURED FOR USE IN ELECTRIC AIRCRAFT", which is incorporated herein by reference in its entirety. In a nonlimiting example, actuator 132 may utilize control datum 116 as input if communication with flight controller 104 is lost.

In an embodiment, actuator 132 may be mechanically connected to a control surface at a first end and mechanically connected to an aircraft at a second end. As used herein, a person of ordinary skill in the art would understand "mechanically connected" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft.

Still referring to FIG. 1, in an embodiment, actuator 132 may include a computing device or plurality of computing devices consistent with the entirety of this disclosure. Actuator 132 may be designed and/or configured to perform any method, method step, or sequence of method steps in any embodiment described in this disclosure, in any order and with any degree of repetition. For instance, flight actuator 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Actuator 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, actuator 132 may include a piston and cylinder system configured to utilize hydraulic pressure to extend and retract a piston connected to at least a portion of electric aircraft. Actuator 132 may include a stepper motor or server motor configured to utilize electrical energy into electromagnetic movement of a rotor in a stator. Actuator 132 may include a system of gears connected to an electric motor configured to convert electrical energy into kinetic energy and mechanical movement through a system of gears. Actuator 132 may include one or more inverters capable of driving one or more propulsors consistent with the entirety of this disclosure utilizing the herein disclosed system. Actuator 132, one of the combination of components thereof, or another component configured to receive data from flight controller 104 and input control 108, if loss of communication is detected, may be configured to implement a reduced function controller. The reduced function controller may react directly to input control 108, or other raw data inputs, as described in the entirety of this disclosure. Actuator 132 may include components, processors, computing devices, or the like configured to detect, as a function of time, loss of communication with flight controller 104.

Figure 2:
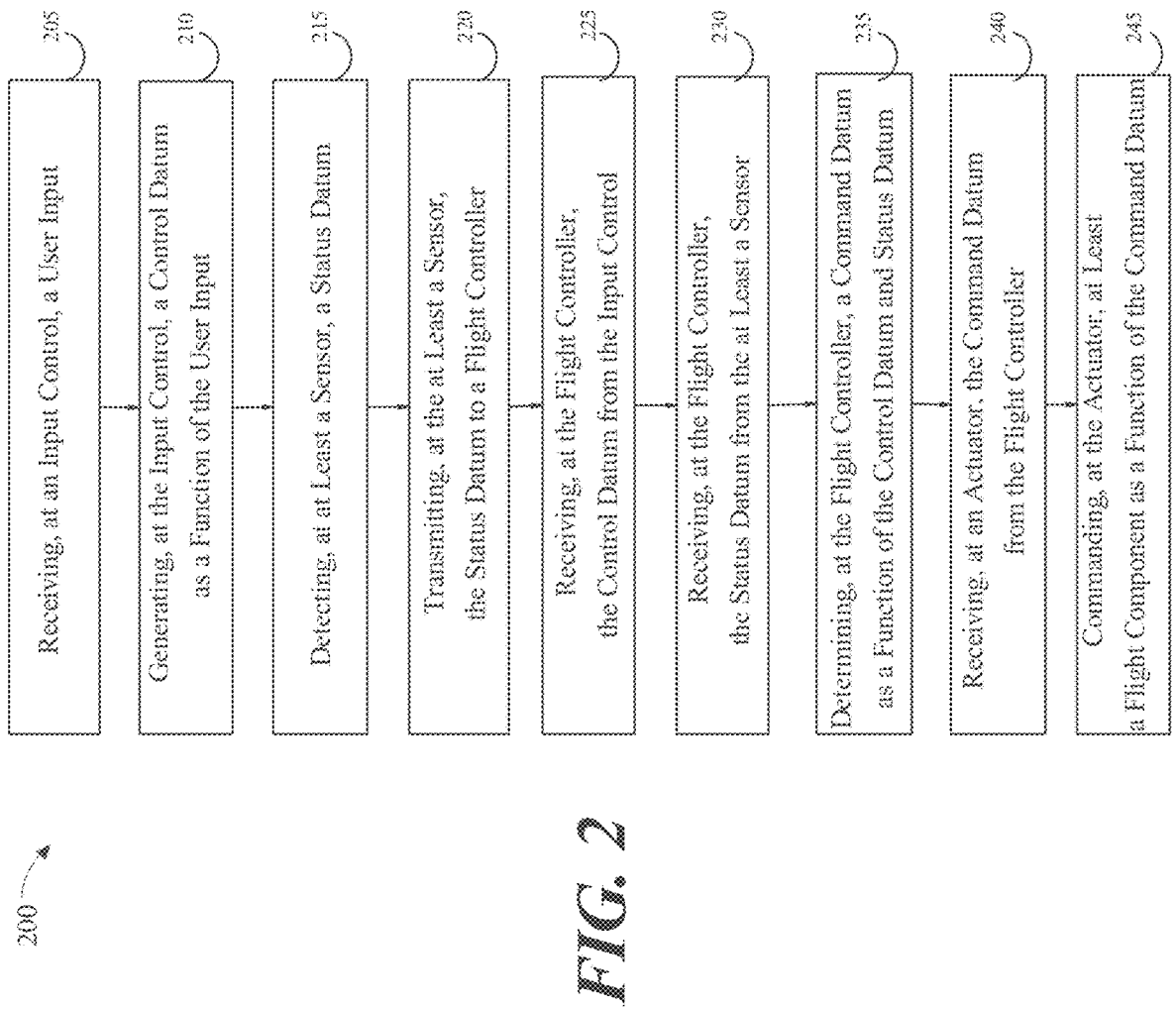
FIG. 2 is a flow diagram of a method for automated flight correction in an electric aircraft.

Now referring to FIG. 2, an exemplary method 200 for automated flight correction in an electric aircraft is illustrated. At step 205, method 200 includes receiving, at input control 108, a user input 112. In a nonlimiting example, user input 108 may be a pilot pushing a throttle lever.

Continuing to refer to FIG. 2. Method 200, at step 210, includes generating, at input control 108, a control datum 116 as a function of the user input 112. In a nonlimiting example, control datum 116 may be a command to increase the speed of the aircraft.

Still referring to FIG. 2. Method 200 includes, at step 215, detecting, at least a sensor 120, status datum 124. In an embodiment, at least a sensor 120 may be communicatively connected to at least a flight component 136. In embodiments, method 200 further includes detecting, at the at least a sensor 120, status datum 124 as a function of at least a flight component 136. In a nonlimiting example, sensor may detect that one of the propellers is not operating within normal conditions. In another nonlimiting example, at least a sensor 120 may detect unsafe outside conditions that may cause electric aircraft to stall if flight altitude is increased.

With continued reference to FIG. 2, at step 220, method 200 includes transmitting, at least a sensor 120, status datum 124 to a flight controller 104. In a nonlimiting example, at least a sensor 120 may detect sudden increase of battery temperature to the flight controller 104, where flight controller 104 may determine that throttle must be reduced as to reduce further damage to the battery.

Continuing to refer to FIG. 2. Method 200, at step 225, includes receiving, at flight controller 104, control datum 116 from the input control 108. In a nonlimiting example, control datum 116 may be a command to increase the aircraft altitude, such as by increasing rotational speed of vertical propellers.

Still referring to FIG. 2, at step 230, method 200 includes receiving, at flight controller 104, status datum 124 from at least a sensor 120. In a nonlimiting example, status datum 124 may include output from all sensors connected to the electric aircraft, which may include normal operation data and anomaly data, such as a flight component operating outside its expected normal operation range.

With continued reference to FIG. 2. At step 235, method 200 includes determining, at flight controller 104, command datum 128 as a function of control datum 116 and status datum 124. In an embodiment, flight controller 104 is communicatively connected to a data store system. In embodiments, method 200 further includes determining, at flight controller 104, the command datum 128 as a function of a machine learning process. In some embodiments, method 200 further includes determining, at flight controller 104, command datum 128 as a function of a flight plan. In embodiments, method 200 further includes comprises overriding, at flight controller 104, command datum 128 as a function of a user input. In an embodiment, method 200 further includes determining, at flight controller 104, command datum 128 as a function of a remote device. In a nonlimiting example, flight controller 104 receives a flight plan and status datum 124 that includes battery useful energy level, and based on flight plan and battery level, flight controller 104 may transmit a throttle level to actuator 132 that is below the throttle level desired by user in order for the aircraft to reach the objective of flight plan without depleting the battery. In another nonlimiting example, a flight operator may set a maximum speed limit for the electric aircraft, where flight controller 104 may only allow throttle up to the set speed limit.

Continuing to refer to FIG. 2, method 200 includes, at step 240, receiving, at actuator 132, command datum 128 from flight controller 104. In a nonlimiting example, command datum 128 may include a reduction of the throttle level. In another nonlimiting example, command datum may include an increase in altitude.

Still referring to FIG. 2, method 200 includes, at step 245, commanding, at actuator 132, at least a flight component 136 as a function of command datum 128. In an embodiment, commanding at least a flight component 136 may include changing a movement datum. In a nonlimiting example, commanding at least a flight component 136 may include reducing the rotation of a forward propulsor and reducing energy consumption of the battery. In another nonlimiting example, commanding at least a flight component 136 may include increasing the rotation level of vertical propellers and increasing energy consumption of the battery.

Figure 3:
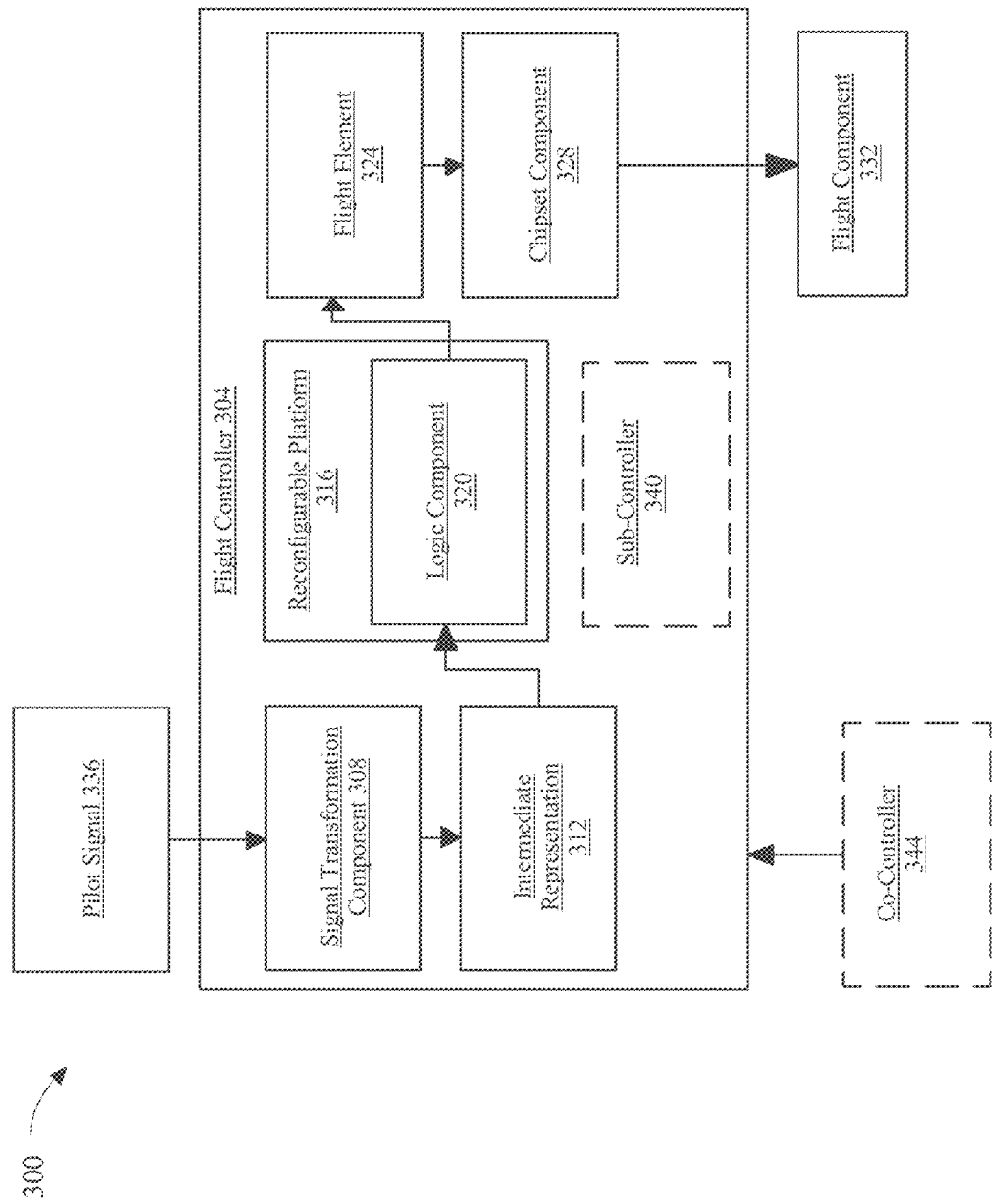
FIG. 3 is an exemplary diagram of a flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs x/that may receive numerical values from inputs to a neural network containing the node and/or from other nodes. Node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input $x_i$, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$, that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
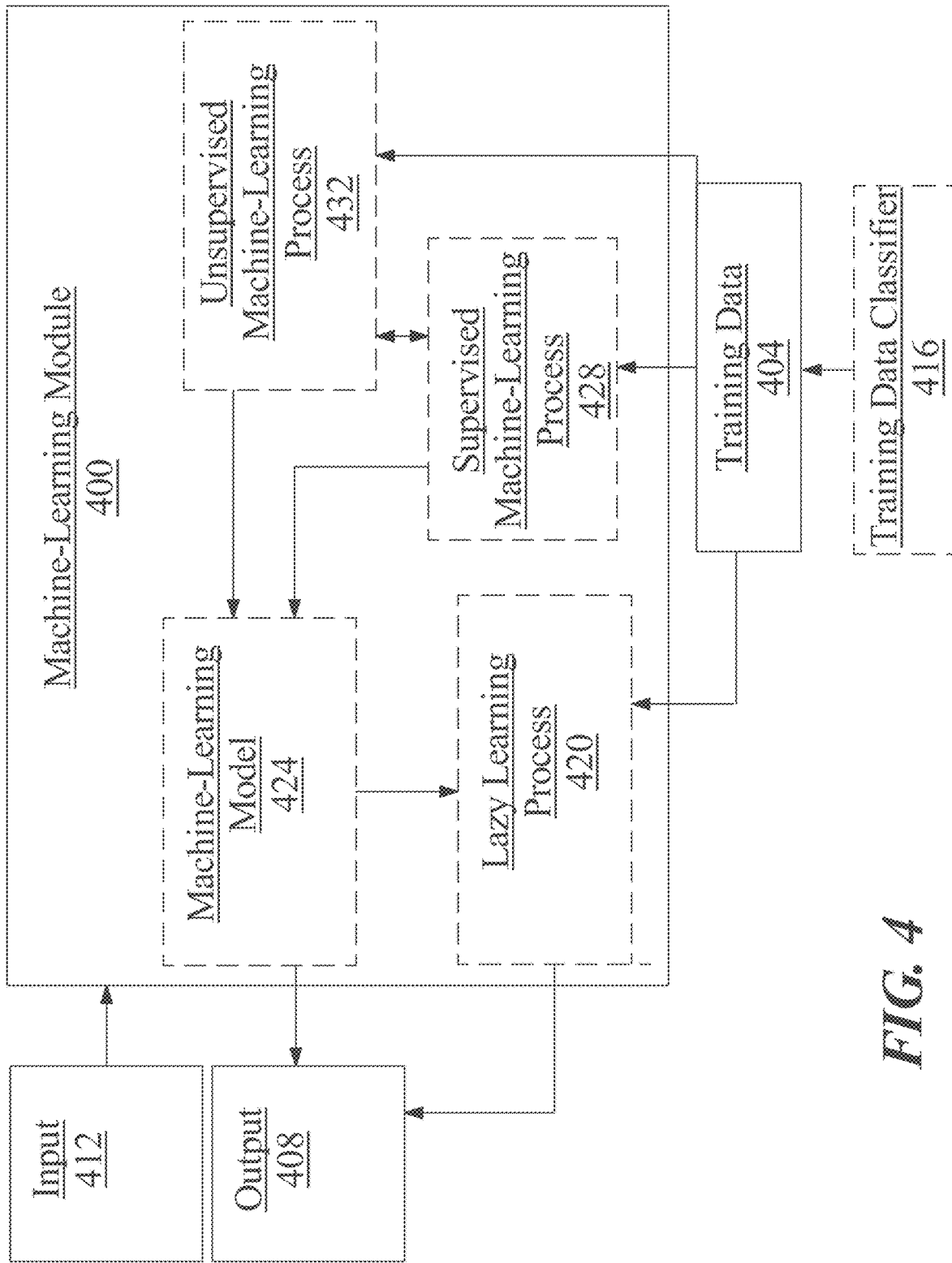
FIG. 4 is an illustrative representation of a machine learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
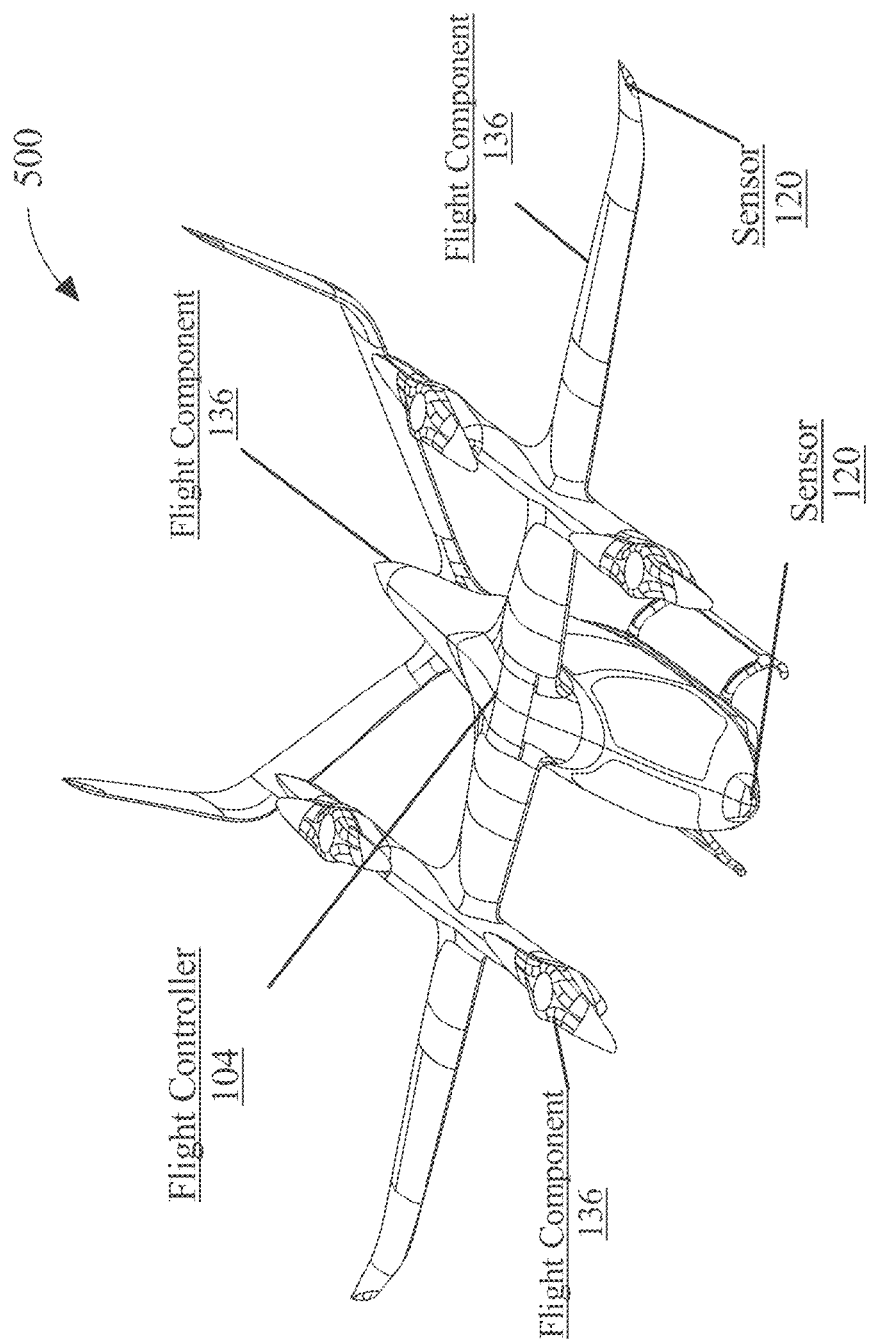
FIG. 5 is an exemplary embodiment of an electric aircraft.

Referring now to FIG. 5, an embodiment of an electric aircraft 500 is presented. Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors connected with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Still referring to FIG. 5, electric aircraft 500 may include at least a sensor 120 connected to the electric aircraft 500. In one embodiment, electric aircraft 500 may include flight controller 104. In embodiments, electric aircraft 500 may include actuator 132. In embodiments, electric aircraft 500 may include at least a flight component 136. In nonlimiting examples, at least a flight component 136 may include vertical propulsors, forward propulsors, ailerons, rudders, battery, windshield wipers, radio transmitters, or any other component of an electric aircraft.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
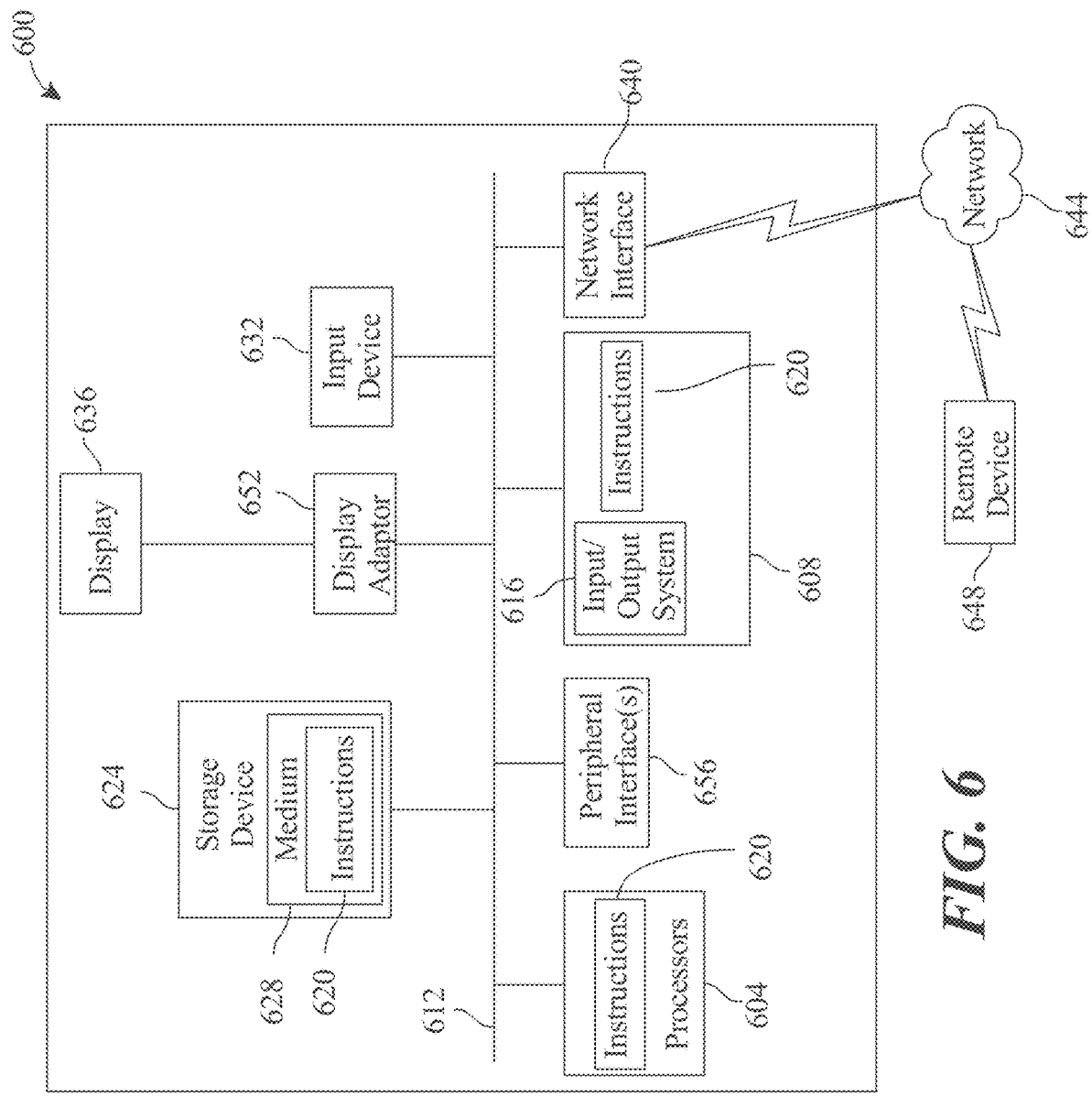
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated flight correction in an electric aircraft, the system comprising:
   an input control configured to generate a control datum;
   a sensor connected to the electric aircraft, wherein the sensor is configured to detect a status datum; and
   a flight controller communicatively connected to the input control and the sensor, wherein the flight controller is configured to:
   determine a command datum as a function of the control datum and the status datum, wherein determining the command datum comprises:
   comparing the control datum to a limitation set based on the status datum; and
   calculating a modified control datum based on a flight plan of the electric aircraft through a remote device.

2. The system of claim 1, wherein determining the command datum further comprises determining a command datum differing from the control datum as a function of the status datum based on comparing the control datum to the limitation.

3. The system of claim 1, further comprising an actuator connected to the flight controller, wherein the actuator is configured to:
   receive the command datum from the flight controller; and
   command a flight component as a function of the command datum.

4. The system of claim 3, wherein commanding the flight component comprises changing a movement datum.

5. The system of claim 3, wherein the sensor is among a plurality of sensors communicatively connected to the electric aircraft, wherein the plurality of sensors is configured to detect the status datum as a function of the flight component.

6. The system of claim 3, wherein the actuator is configured to receive the control datum from the input control.

7. The system of claim 1, wherein the input control is configured to receive user input, and wherein the user input comprises an explicit signal.

8. The system of claim 1, wherein the command datum comprises an element of data identifying an element of the flight plan of the electric aircraft.

9. The system of claim 1, wherein the sensor comprises a sense-and-avoidance system (SAA), and wherein the SAA further comprises at least one of a traffic collision avoidance system (TCAS) or a ground-based sense-and-avoidance (GBSAA).

10. The system of claim 1, wherein the flight controller is further configured to determine the command datum as a function of an input received from the remote device.

11. A method for automated flight correction in an electric aircraft, the method comprising:
    generating, at an input control, a control datum;
    detecting, at a sensor, a status datum; and
    determining, at a flight controller, a command datum as a function of the control datum and the status datum, wherein determining a command datum comprises:
    comparing the control datum to a limitation set based on the status datum; and calculating a modified control datum based on a flight plan of the electric aircraft through a remote device.

12. The method of claim 11, wherein the method further comprises:
    receiving, at the flight controller, the control datum from the input control; and
    receiving, at the flight controller, the status datum from the sensor.

13. The method of claim 11, wherein determining the command datum further comprises transmitting the command datum to the remote device, and wherein the remote device includes the flight plan of the electric aircraft.

14. The method of claim 11, wherein determining the command datum further comprises determining the command datum differing from the control datum as a function of the status datum based on comparing the control datum to the limitation.

15. The method of claim 11, wherein the method further comprises:
   receiving, at an actuator, the command datum from the flight controller; and
   commanding, at the actuator, a flight component as a function of the command datum.

16. The method of claim 15, wherein commanding the flight component comprises changing a movement datum.

17. The method of claim 15, wherein the sensor is among a plurality of sensors communicatively connected to the electric aircraft, wherein the plurality of sensors is configured to detect the status datum as a function of the flight component.

18. The method of claim 11, wherein generating the control datum further comprises receiving a user input, and wherein the user input comprise an explicit signal.

19. The method of claim 11, wherein the command datum comprises an element of data identifying an element of the flight plan of the electric aircraft.

20. The method of claim 11, wherein method further comprises determining, at the flight controller, the command datum as a function of an input received from a remote device.

* * * * *